Thomas E. Bolner INVENTOR

March 7, 1967   T. E. BOLNER   3,307,221
MOLD FOR MAKING INSULATED ROCKET MOTOR NOZZLES
Filed Nov. 12, 1963   5 Sheets-Sheet 3
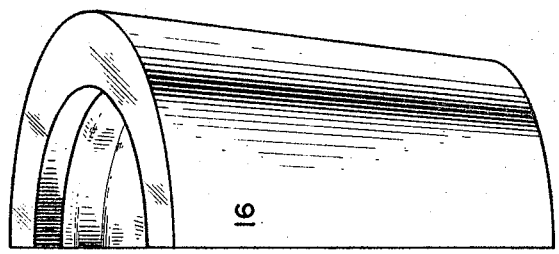
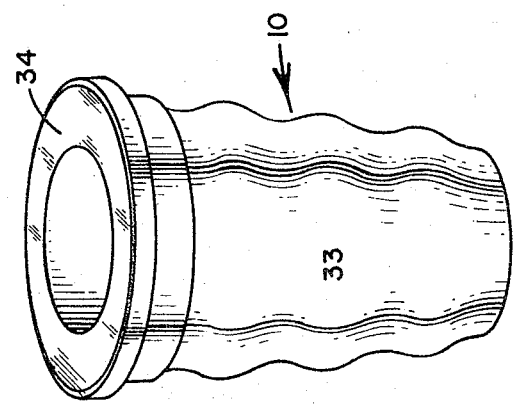
Fig. 3
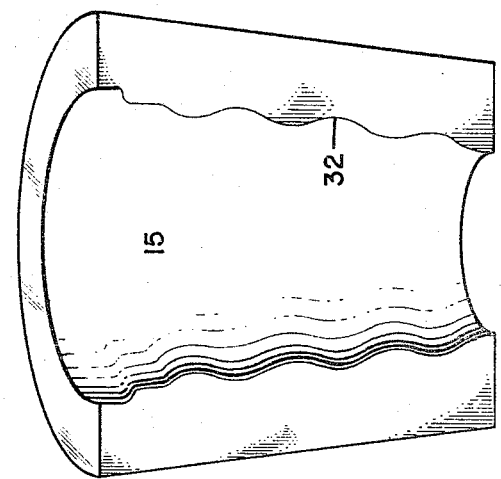
Thomas E. Bolner INVENTOR.
BY
ATTORNEY Thomas E. Bolner INVENTOR.

BY

ATTORNEY

United States Patent Office 3,307,221
Patented Mar. 7, 1967

3,307,221
MOLD FOR MAKING INSULATED ROCKET
MOTOR NOZZLES
Thomas E. Bolner, Fayetteville, Tenn., assignor to Thiokol Chemical Corporation, Bristol, Pa., a corporation of Delaware
Filed Nov. 12, 1963, Ser. No. 322,880
1 Claim. (Cl. 18—16.5)

This invention relates to an improved design and fabrication technique of insulated rocket motor nozzles and, more particularly, to a method wherein the outer shell or wall structure of the nozzle and the plastic insulating liner therefore are shaped and molded simultaneously.

It is a well-known fact that lightweight inert components in a rocket propulsion system can materially reduce the over-all weight of the system. In the case of nozzle fabrication, it is the usual practice to attach to the inside of the outer shell or wall structure of the nozzle, by bonding or other means, a plastic insulating liner material that is necessary to protect the outer shell or wall structure of the nozzle from both thermal and erosion damage.

Prior to this invention, nozzle weight was reduced by the use of higher strength metals and/or fiber glass-plastic structural components.

This invention, however, contemplates the advantages of using the inherent increased modulus and strength of work-hardened metals or plastics and a plastic insulating liner by simultaneously molding the outer shell or wall structure of the nozzle and the plastic insulating liner therefor as an integral unit so that both will incorporate their inherent strengths and compatibility into the completed nozzle.

One difficulty in this approach was bonding the plastic insulating liner to the outer shell or wall structure of the nozzle without the necessity of the use of fastening means, such as bolts or the like, that would add extra weight to the nozzle, with the added requirement that such bonding would be strong enough to withstand the conditions that are present during the firing of the rocket motor.

An object of this invention is to provide a mold for simultaneously molding and forming an insulated nozzle.

With the above and other objects and advantages in view, the invention consists of the novel details of construction, arrangement, and combination of parts more fully hereinafter described, claimed and illustrated in the accompanying drawings in which:

FIGURE 3 shows interior and exterior perspective views of the dies and the form of the completed nozzle of FIGURE 2 as formed thereby.

Figure 1:
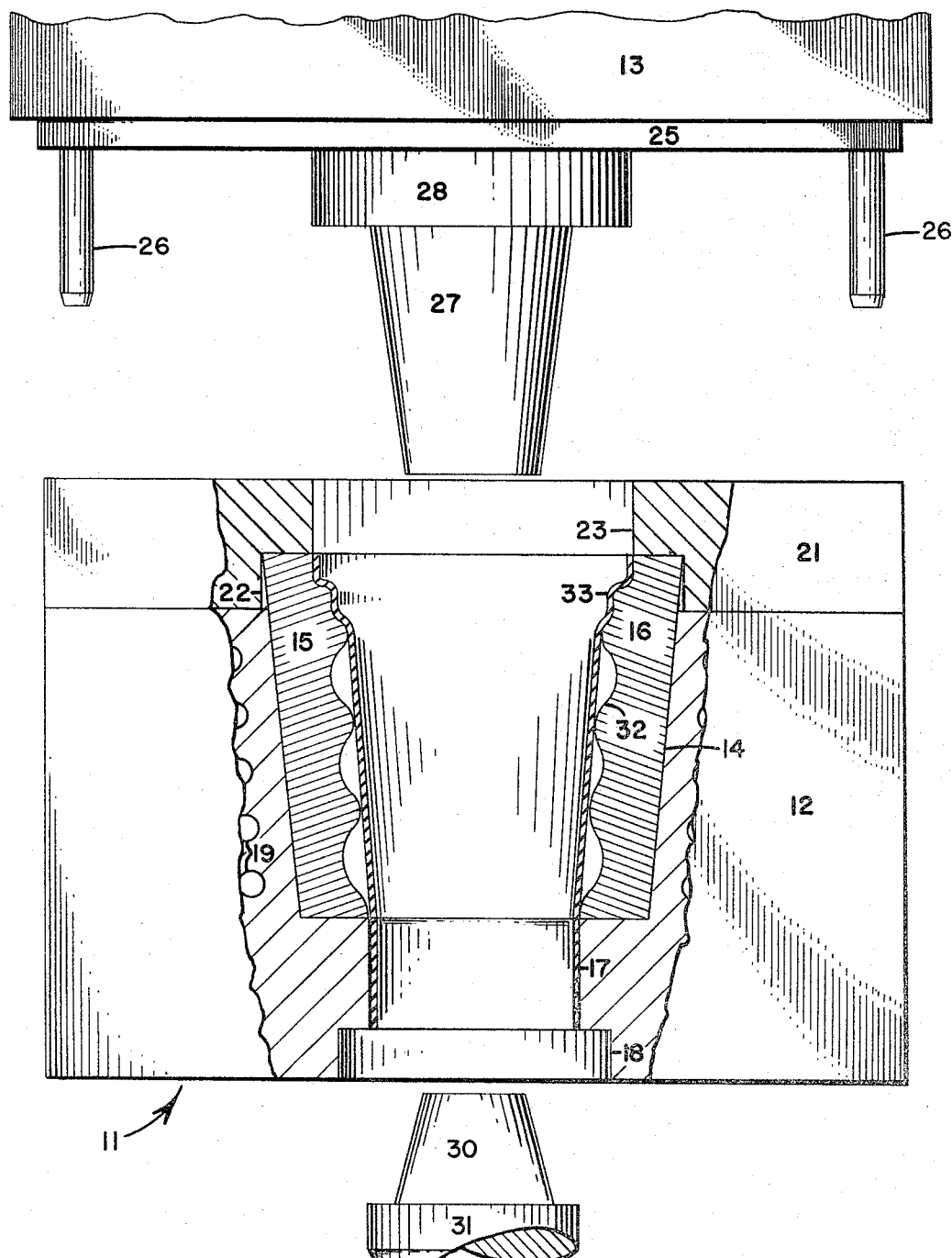
FIGURE 1 is an elevational view, partly broken away and partly in section, of the molding apparatus with the nozzle shell in position prior to the molding operation.

Referring more in detail to the drawings wherein like parts are designated by like reference numerals, the reference numeral 10 is used to generally designate one form of a completed nozzle forming an embodiment of a nozzle assembly fabricated by the method of the present invention.

Figure 2:
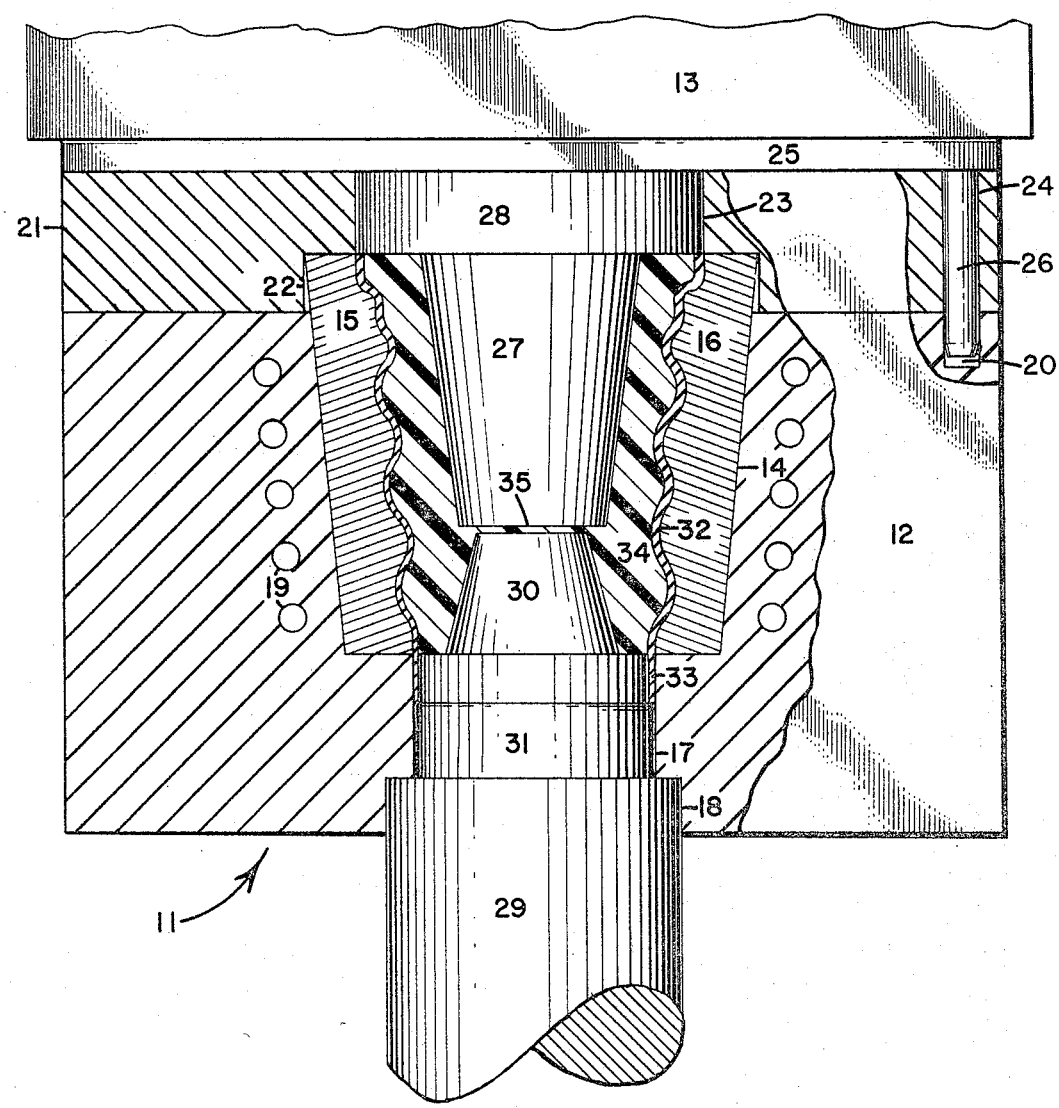
FIGURE 2 is an elevational view, partly broken away and partly in section, of the molding apparatus showing, in section, the appearance of one form of the completed nozzle embodying the invention after the molding operation.

In FIGURES 1 and 2, there is shown a molding apparatus 11 which includes a lower stationary bed plate 12 and an upper plunger section 13 which is adapted to be forced downwardly by any suitable power means, such as a hydraulic press or the like (not shown).

The bed plate 12 is provided with a smooth substantially-truncated, conical-shaped cavity 14 in which are positioned the substantially-truncated, conical-shaped die sections 15 and 16 respectively. Contiguous with the cavity 14 in axial alignment therewith is a cylindrical cavity 17 of reduced dimensions which terminates in a cylindrical-shaped recess 18. The recess 18 is in axial alignment with the cavities 14 and 17; and while its dimensions are larger than the cavity 17, they are smaller than the cavity 14. The bed plate 12 is also provided with a plurality of passageways 19 that are positioned therein in angular relation to the cavity 14 and into which may be introduced, as desired, a heating or cooling medium such as water or the like. There are also provided in the upper surface of the bed plate 12 a plurality of guide pin receiving sockets 20.

Nested on the upper surface of the bed plate 12 is a removable keeper plate 21, and the under surface of the plate 21 is provided with a cylindrical-shaped recess 22 to receive the upper ends of the die sections 15 and 16 and a cylindrical cavity 23 that is in axial alignment with the recess 22 but is of smaller dimensional area. The plate 21 is also provided with a plurality of guide pin receiving bores 24 that are adapted to be aligned with the sockets 20 in the bed plate 12.

The upper plunger section 13 has an aligning plate 25 on the bottom surface thereof which is of the same dimensional size as the bed plate 12, and a plurality of guide pins 26 depending from the plate 25 extend through the bores 24 in the keeper plate into the sockets 20 of the bed plate 12 during the molding operation, as shown in FIGURE 2.

Depending from the center of the plate 25 in alignment with the cavity 14 in the bed plate 12 is a truncated, conical shaped punch 27; and contiguous with the inner end of the punch 27 is a cylindrical portion 28 that is integral with or secured to the plate 25 and is adapted to be received in the cylindrical cavity 23 in the keeper plate 21.

Mounted for vertical reciprocal movement below the bed plate 12 in axial alignment with the cavity 14 is a mandrel 29 which is adapted to be forced upwardly by any suitable power means, such as a hydraulic press or the like (not shown). The mandrel 29 has an inner truncated, conical portion 30 that will extend into the cavity 14 and a contiguous reduced cylindrical portion 31 that will extend into the cavity 17 in the bed plate 12 as the mandrel 29 extends into the recess 18 during the molding operation, as shown in FIGURE 2.

Viewing FIGURE 3, it will be noted that the interior surface of each of the die sections 15 and 16 is provided with a plurality of concentric U-shaped grooves 32 and the exterior surfaces thereof are contoured to precision fit and conform with the surface area of the cavity 14. It will also be noted that the metal shell 33 of the nozzle 10 has been forced by the molding apparatus 11 to assume a contour that conforms to the formation of the grooves 32 in the die sections 15 and 16.

In molding the insulated rocket motor nozzle 10 forming the embodiment of the present invention, the molding apparatus 11 which includes the bed plate 12 and keeper plate 21 with the die sections 15 and 16 in position in the cavity 14 are heated to a temperature of 300° F. by introducing into the passageways 19 a heating medium. The exterior of the metal shell 33 is then coated with a high temperature lubricant and inserted into the die sections 15 and 16, as shown in FIGURE 1. The shell 33 is then permitted to attain the temperature of the molding apparatus 11, as previously stated.

A sufficient amount of insulating material 34 to completely insulate the nozzle 10 is then placed into the shell 33 and the plunger section 13 is then forced downwardly with the punch 27 compressing the insulating material 34. At the same time, the mandrel 29 is forced upwardly and the insulating material 34 is compressed between the two forces; and compression of the plunger section 13 and mandrel 29 are continued until the insulating material 34 has forced the shell 33 into the shape of the nozzle 10, as shown in FIGURE 3. The excess of the insulating material 34, if any, forms the flash 35 shown in FIGURE 2; and the compression previously set forth is retained until the insulating material 34 is completely cured.

Upon completion of the curing stage, the plunger section 13 is raised, the keeper plate 21 is removed, and handling means are applied to the upper ends of the section 15 and 16 so that they can be removed from the cavity 14.

The nozzle 10 will be confined within the sections 15 and 16; and the entire assembly will be removed to a convenient location where the sections 15 and 16 can be removed from the nozzle 10.

After the sections 15 and 16 are removed, the flash 35 is machined out and the excess length of the shell 33, as shown in FIGURE 2, is trimmed off and the nozzle 10 is ready to be assembled to the particular rocket motor for which it has been designed.

The nozzle 10 is completely cured and requires no post-cure after the molding operations.

One particular advantage of this method is that the metal shell 33 is further affected by the applied pressure and stretched to bring out the "ultra-hardness" of the structure which is required for nozzles. The metal shell 33 may be made of any suitable word-hardenable metal; and the insulating material 34 may be a commercial product known as "Durez" Molding Composition No. 16771½ Natural. The metal shell 33 is put under tension; and the insulating material 34 is put under compression due to the force applied to it during the molding operations. These conditions enhance the over-all strength of the nozzle 10 so that the counteracting forces of the two materials maintain a unitary strength throughout the firing of the rocket motor.

The depth, width, and shape of the grooves 32, as well as the number thereof, are determined and are increased or decreased as the peculiar requirements of the particular nozzle being molded are determined.

Figure 4:
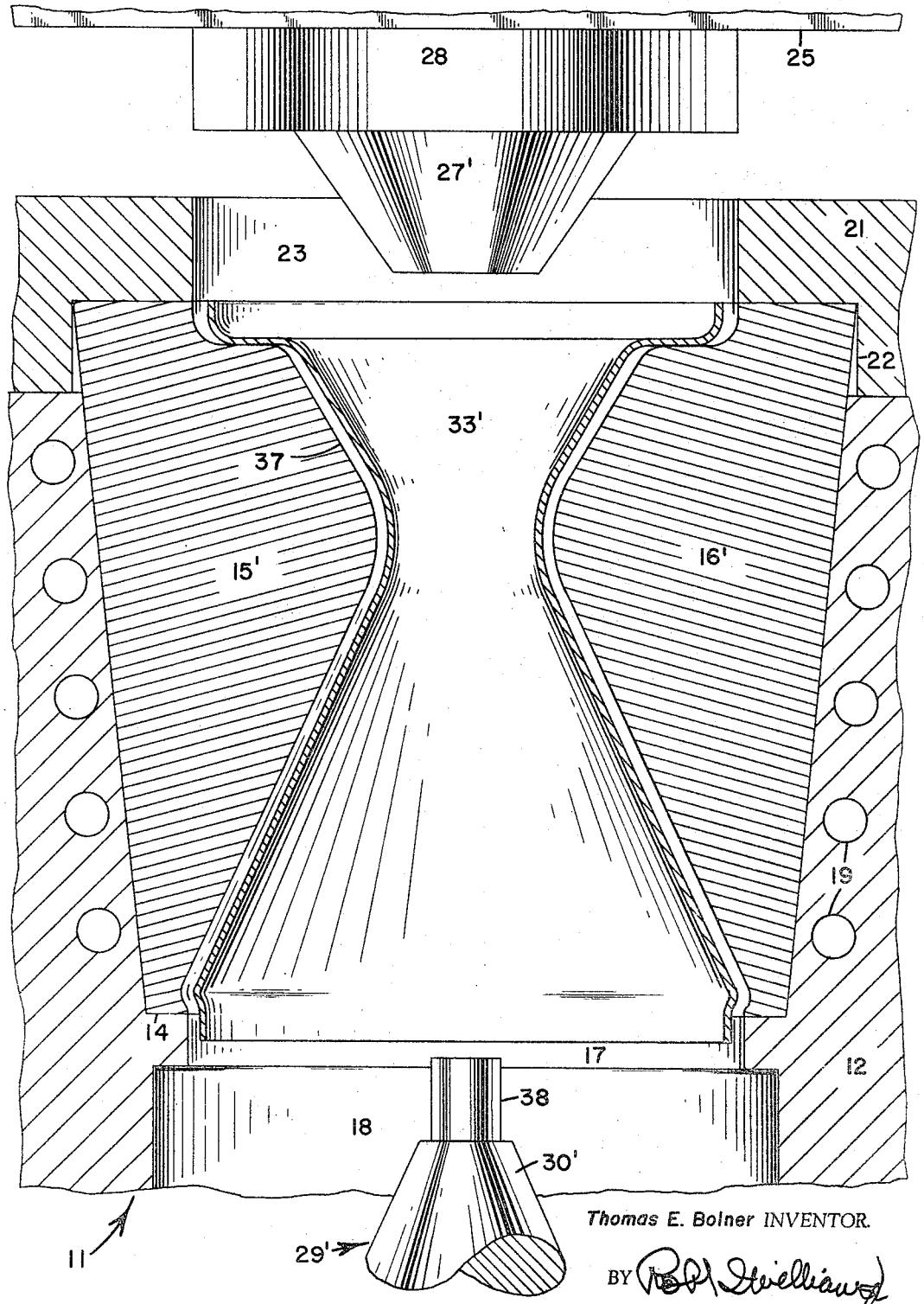
FIGURE 4 is an enlarged view, similar to FIGURE 1, wherein a modified form of the nozzle shell is shown in position prior to the molding operation.
Figure 5:
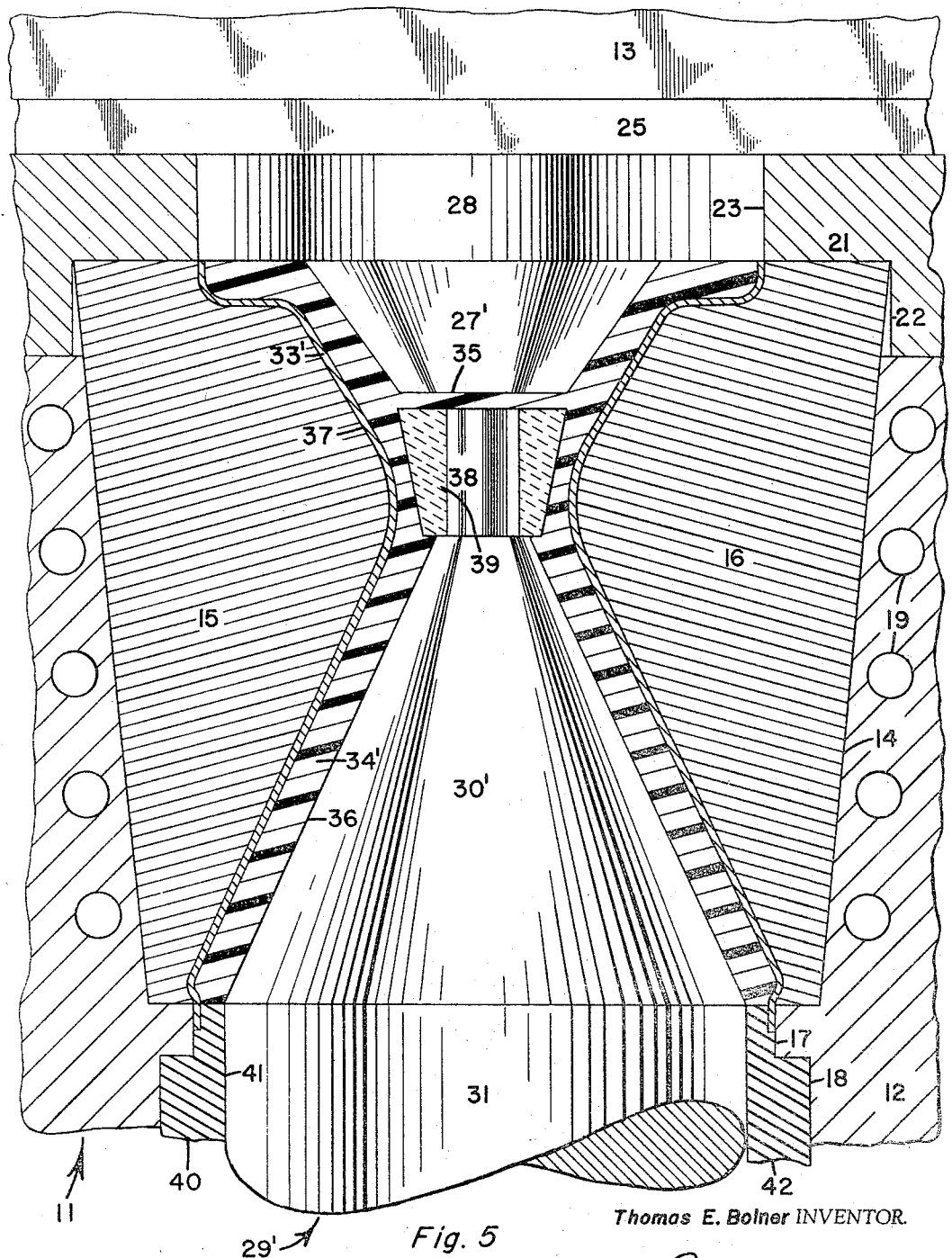
FIGURE 5 is an enlarged view, similar to FIGURE 2, showing, in section, the modified form of the completed nozzle embodying the invention after the molding operation.

The fabrication of the modified form of the nozzle assembly 36, as shown in FIGURES 4 and 5, includes the use of the molding apparatus 11 except for the minor changes, as now set forth. The substantially-truncated die sections 15' and 16' have an interior surface 37 that conforms to the well-known shape this is commonly called an hour-glass configuration. This configuration replaces the grooves 32 in the die sections 15 and 16.

This change in the configuration of the interior surface 37 of the die sections 15' and 16' requires a somewhat different shape punch 27'; and the mandrel 29' includes a somewhat modified conical portion 30'. The portion 30' is also provided with a cylindrical stud 38 on which is positioned a graphite throat insert 39.

In order to properly shape the shell 33' and the insulating material 34', a ring 40 having a reduced portion 41 to fit the cavity 17 and a somewhat larger portion 42 to fit the recess 18 is positioned on the mandrel 29' in circumjacent relation to the portion 31 thereof. Except for the changes previously referred, the remainder of the molding apparatus 11 functions as previously described.

The method previously described is followed in every detail and the only difference that is apparent in the completed nozzle 36 is the shape thereof.

The method used will thus produce an integral nozzle assembly wherein the insulation and the outer shell or wall structure of the nozzle are simultaneously molded and formed to increase strength and durability of the nozzle.

Thus, a highly efficient nozzle is produced and it is believed that the manner of carrying out the invention will be clear to those skilled in the art. It also being understood that minor changes therein may be made providing such changes fall within the spirit of the invention and the scope of the appended claim.

Having thus described the invention, what is claimed as new and desired to be secured by Letters Patent is:

A molding apparatus for simultaneously molding and shaping the insulation and shell of a rocket motor nozzle comprising, a bed plate having a central truncated conical-shaped cavity therein, said bed plate having a cylindrical-shaped cavity therein that is contiguous with said central cavity and in axial alignment therewith at one end thereof, said cylindrical cavity being of reduced dimensions in relation to said central cavity, said cylindrical cavity terminating in and contiguous wth a cylindrical-shaped recess, said recess being of greater dimensions than said cylindrical-shaped cavity, but of smaller dimensions than said central cavity, said bed plate having a plurality of passageways positioned therein in angular relation to said central cavity for introducing a heating medium into said bed plate, said bed plate having a plurality of guide pin receiving sockets therein, a pair of preformed die sections positioned in said central cavity, a keeper plate having in the undersurface thereof a cylindrical-shaped recess, a cylindrical-shaped cavity that is contiguous with said recess in axial alignment therewith but of smaller dimensional area than said cylindrical-shaped cavity, and a plurality of guide pin receiving bores, said keeper plate being positioned on the upper surface of said bed plate so that the upper ends of said die sections are received in said cylindrical-shaped recess and said guide pin receiving bores are in alignment with the guide pin receiving sockets in said bed plate, said keeper plate being positioned on said bed plate to retain said die sections in the central cavity in said bed plate, an upper movable plunger section having an aligning plate on the bottom surface thereof that is of the same dimensional size as said bed plate, a cylindrical portion integral with the central portion of the bottom surface of said aligning plate, a truncated conical-shaped punch integral with the central portion of the bottom surface of said cylindrical portion, a plurality of guide pins secured to and depending from said aligning plate so that when said plunger section is moved into engagement with said bed plate said punch will be received in the central cavity of said bed plate, the cylindrical portion on said aligning plate will be received in the cylindrical-shaped recess in said keeper plate and the guide pins on said aligning plate will enter the guide pin receiving bores in said keeper plate and the guide pin receiving sockets in said bed plate, a movable mandrel for cooperation with said bed plate at the bottom thereof, said mandrel having a centrally located inner truncated conical portion thereon that will enter the central cavity of said bed plate, a reduced cylindrical inner portion that is disposed between said conical portion and said mandrel, said cylindrical inner portion being contiguous with said central portion and integral therewith and with said mandrel, said cylindrical inner portion and said inner conical portion entering the cylindical cavity and the central cavity of said bed plate as said mandrel enters the cylindrical-shaped recess in said bed plate when said punch and said mandrel apply simultaneous compression to the shell and the insulation to mold the rocket motor nozzle.

References Cited by the Examiner

UNITED STATES PATENTS

| | | | |
|---|---|---|---|
| 1,589,913 | 6/1926 | Wells | 264—266 X |
| 1,702,278 | 2/1929 | Simons. | |
| 2,122,960 | 7/1938 | Schwartzwalder. | |
| 2,158,044 | 5/1939 | Haller | 264—266 X |
| 2,777,162 | 1/1957 | Banzhof | 25—102 X |
| 2,995,776 | 8/1961 | Giardini et al. | 18—16.5 |
| 3,209,057 | 9/1965 | Lassman | 18—16.5 X |

ROBERT F. WHITE, *Primary Examiner.*

L. S. SQUIRES, R. B. MOFFITT, *Assistant Examiners.*